US012560426B2

(12) United States Patent
Doedens et al.

(10) Patent No.: US 12,560,426 B2
(45) Date of Patent: Feb. 24, 2026

(54) METHOD FOR INSPECTING SURFACES AND INTERFACES OF HIGH VOLTAGE CABLE COMPONENTS

(71) Applicant: NEXANS, Courbevoie (FR)

(72) Inventors: Espen Doedens, Halden (NO); Endre Verlo Nes, Lier (NO)

(73) Assignee: NEXANS, Courbevoie (FR)

( * ) Notice: Subject to any disclaimer, the term of this patent is extended or adjusted under 35 U.S.C. 154(b) by 149 days.

(21) Appl. No.: 18/232,347

(22) Filed: Aug. 9, 2023

(65) Prior Publication Data

US 2024/0068806 A1 Feb. 29, 2024

(30) Foreign Application Priority Data

Aug. 10, 2022 (EP) ..................................... 22306208

(51) Int. Cl.
| | |
|---|---|
| *G01B 11/30* | (2006.01) |
| *G01N 21/952* | (2006.01) |
| *G01B 11/24* | (2006.01) |
| *G01B 21/20* | (2006.01) |

(52) U.S. Cl.
CPC ........... *G01B 11/30* (2013.01); *G01N 21/952* (2013.01); *G01B 11/24* (2013.01); *G01B 21/20* (2013.01); *G01B 2210/52* (2013.01)

(58) Field of Classification Search
CPC .... G01B 11/30; G01B 2210/52; G01B 11/24; G01B 11/303; G01N 21/952; G01N 29/265
See application file for complete search history.

(56) References Cited

U.S. PATENT DOCUMENTS

| | | | |
|---|---|---|---|
| 2003/0079360 A1 | 5/2003 | Ziegler | |
| 2020/0005448 A1* | 1/2020 | Subramanian | ......... G06V 20/20 |
| 2021/0041375 A1 | 2/2021 | Harjuhahto | |
| 2021/0390680 A1* | 12/2021 | Hamano | ............... G01N 29/28 |
| 2022/0297241 A1* | 9/2022 | Okuma | .................. G01B 11/24 |

(Continued)

FOREIGN PATENT DOCUMENTS

| | | |
|---|---|---|
| CN | 106 225 737 | 9/2018 |
| DE | 102019113799 A1 | 11/2020 |
| EP | 3 901 571 | 10/2021 |

(Continued)

OTHER PUBLICATIONS

European Search Report dated Jan. 19, 2023.

(Continued)

*Primary Examiner* — Georgia Y Epps
*Assistant Examiner* — Erin R Garber
(74) *Attorney, Agent, or Firm* — CANTOR COLBURN LLP

(57) ABSTRACT

A method and a system is provided for inspecting surfaces and/or interfaces of high voltage and/or medium voltage cable components. The method includes capturing and storing a set of 3-dimensional, 3D, surface geometry measurement data of an area of interest of a surface of the cable or cable component by moving a 3D surface scanner about the cable over the area of interest. The captured 3D surface geometry measurement data are inspected to determine smoothness of the scanned surface, and the smoothness is compared with threshold data to provide a quality report for the scanned surface.

14 Claims, 7 Drawing Sheets

(56) References Cited

U.S. PATENT DOCUMENTS

2022/0334582 A1* 10/2022 Bryner ................. B25J 19/0054
2023/0023163 A1* 1/2023 Gundel .................. H01R 43/28

FOREIGN PATENT DOCUMENTS

JP          2018 147803         9/2018
JP           2018147803 A  *  9/2018

OTHER PUBLICATIONS

Doedens Espen et al: "Space Charge Accumulation at Material Interfaces in HVDC Cable Insulation Part I—Experimental Study and Charge Injection Hypothesis", Energies, vol. 13, No. 8, Apr. 17, 2020.
European Search Report for corresponding application EP25190139; Mail date Sep. 25, 2025.
European Search Report for corresponding application EP25190137. Mail date Sep. 25, 2025.

* cited by examiner

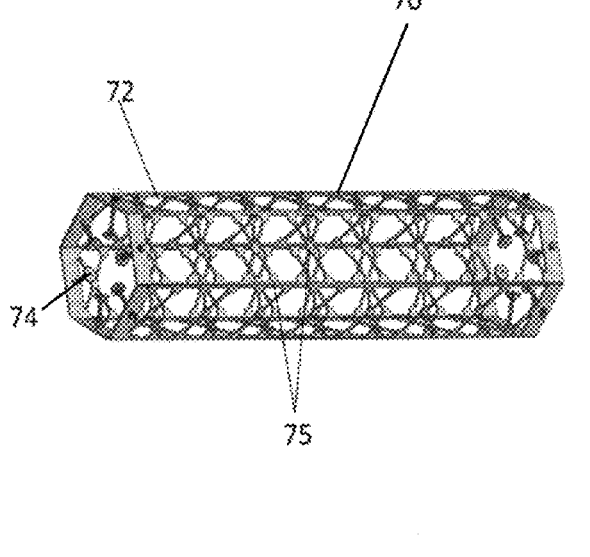
Fig. 7a
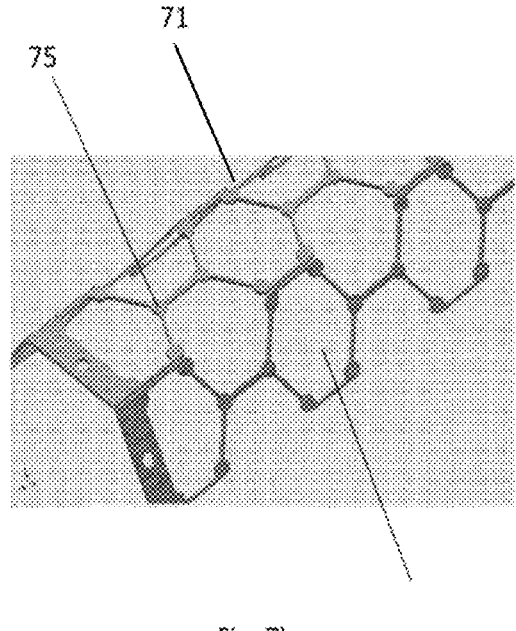
Fig. 7b       73

METHOD FOR INSPECTING SURFACES AND INTERFACES OF HIGH VOLTAGE CABLE COMPONENTS

RELATED APPLICATION

This application claims the benefit of priority from European Patent Application No. 22 306 208.4, filed on Aug. 10, 2022, the entirety of which is incorporated by reference.

TECHNICAL FIELD

The present invention relates to high voltage and medium voltage cables, in particular to a method for inspecting surfaces and/or interfaces of high voltage and/or medium voltage cable components.

BACKGROUND

A high voltage (HV) and medium voltage (MV) cable is used for electric power transmission at medium and high voltage, e.g. above 1 000 V. Such cables include a conductor and an insulation. The insulation may consist of polymers or polyethylene, including ethylene propylene rubber (EPR) and cross-linked polyethylene (XLPE). At inner and outer sides of the insulation semiconducting layers are fused to the insulation. The semiconducting layers prevent air-filled cavities between the metal conductors and the dielectric so that small electric discharges cannot arise and endanger the insulation material. The insulation is usually also covered by a copper or aluminum wire screen, or a lead or aluminium or copper jacket, or combinations thereof. This metallic screen or jacket is followed by a polymeric (e.g. PE or PVC) outer sheath.

The cables are manufactured in cable manufacturing lines using extrusion. The quality control and meeting product specifications are very important in cable production. A failure due to dielectric breakdown in the HV-cable may cause an outage of power supply. For instance, high voltage cables are used for long length connections for power distribution and power transmission. The manufacturing quality is monitored during the operation of the cable manufacturing line to assure the quality of the final product. The final product is usually an assembly comprising cable lengths connected together as well as connected accessories such as terminations, GIS terminations, asymmetric joints, HV or MV joints, MV terminations, MV plugin terminations, etc.

Insulators and spacers used in HV assemblies, and MV assemblies, such as epoxy insulators, termination housings (possibly with rain sheds), and other insulative spacers providing a mechanical connection between high voltage and ground in HV cable products, are subjected to electric stress. This electric stress can be oriented tangentially, perpendicularly, or a combination thereof, to the surface of such components. Any defects, protrusions, irregularities, on this surface may hamper the long-term electrical performance of the component, by means of localized field enhancement which can result in a flashover from/to the adjacent surfaces or along the surface of the component. The quality control (QC) of such surfaces is thus essential.

HV electrodes, such as toroids, grading rings used on HV components/apparatus as well as electrodes within oil insulated assemblies, or within gas insulated switchgear (GIS) require high quality surface finish, as any protrusions present on the surfaces may initialize local and/or global discharges, which ultimately can lead to failure of the system.

Such electrodes can be positioned on HV potential, on floating potential, or ground potential, and thus typically feature electric fields perpendicular to the surface, such that any irregular shape or protrusion can create local field enhancement and thus pose as a weak point.

To control this surface finish is a costly and time staking process; and for many of the such electrodes there is lacking a fast, accurate, cost efficient quality control procedure that ensures the surface finish and geometry is according to the specifications.

Electrodes used within gas or oil filled HV cable components/apparatus'/accessories require high quality surface finish, as any higher levels of surface roughness may reduce the electrical performance and the electrical durability of the system. Such electrodes can be positioned on HV potential, on floating potential, or ground potential, and thus typically feature electric field perpendicular to the surface, such that any roughness can create local field enhancement several places at all rough asperities, which reduces electrical performance through higher leakage currents and lowered breakdown strength.

To control this surface finish, when parts are machined and supplied from external vendors, is very important, ensuring that (often in drawings) specified levels of surface smoothness are met by the parts manufacturer.

Traditional quality control of roughness levels on the surface of such electrode parts comprises using 2d mechanical stylus roughness measurements, as scientific publications showing correlation between currents and measured 2d roughness measurement results exist.

While 2d stylus measurements can assess roughness levels, optical profilometry provides more accurate, higher resolution results in three dimensions.

Traditional quality control in the High voltage industry involves inspection by the human eye, which does not represent a fool-proof solution. Other may include some form of electrical testing requiring HV energization of the component, such as PD testing.

EP3901571 discloses a system and a method for determining a quality of a surface of a high voltage cable end using a 3D scanner. The method comprises moving a non-contact surface scanner about the cable end, measuring distance to the surface over the area of the surface by sequentially measuring a plurality of sub-areas of the area of the surface, creating a continuous 3D surface geometry measurement of the surface of the cable end and comparing, using the continuous 3D surface geometry measurement with at least one surface geometry acceptance threshold determining the quality of the surface of the high voltage cable end.

A further related situation is that extrusion equipment, such as screws, dies, matrices, etc. experiences wear during its operational lifetime and thus requires maintenance from time to time. Before and after the maintenance, generally two parts of the equipment needs to be assessed:

Surface finish (micro-geometric state)

Overall dimensions such as warping, small missing pices, larger geometric defects etc.

Tracking such wear and assessing the quality of the equipment after the repair session of the complex geometrical shapes, over multiple maintenance sessions during the lifetime of the components can be challenging.

Traditionally, visual inspection is typically performed manually by the operators. Also, photographs can be taken, for immediate inspection and for later reference.

No off-the-shelf digital inspection tools exists for extrusion equipment

Objects and Summary

The object of the invention is to provide a method and system for inspecting surfaces and/or interfaces of cable components of HV and MV cables, such as electrodes, insulators and spacers.

The object of the invention is achieved by means of the patent claims.

In the exemplary embodiments, various features and details are shown in combination. The fact that several features are described with reference to a particular example should not be construed as implying that those features be necessity have to be included together in all the embodiments of the invention.

Conversely, features that are described with reference to different embodiments should not be construed as mutually exclusive. As those skilled in the art will readily understand, embodiments that incorporate any subset of features described herein and that are not expressly interdependent have been contemplated by the inventor and are part of the intended disclosure. However, explicit descriptions of all such embodiments would not contribute to the understanding of the principles of the invention, and consequently some permutations have been omitted for the sake of simplicity.

The term "surface" can in the context of this description mean any surface of a HV insulator, such as epoxy insulators/spacers used in GIS systems, rain sheds on outside of the outdoor sealing end (termination), or the inside of the termination.

"Surface" can also mean the surface of any HV electrode, such as electrode parts used in air, oil or gas on positions in or close to the HV apparatus where the surface of the electrode is subjected to high field strength.

Insulative parts normally have two surfaces ("inner" and "outer"), which are subjected to high field strength along and across the surface. The purpose is thus to scan the entire component for inspection. Next step is to run a post-processing algorithm on the scanned data that detects and highlights any irregularities such that a go/no go criteria, as well as an inspection report can be generated. The post-processing algorithm can be designed to determine the orientation of the defects with respect to the tangential field stress. Then the scanned data for the full life-cycle of the product/part can be stored, enabling also its use in physics based digital twin models.

During scanning of smooth surfaces, 3D markers and/or talc spray is often used on the surface during the scanning process, respectively to provide accurate positioning and to minimize glaring. The 3D markers are used for the scanner to keep track of its angle and position in relation to the object to be measured, and they are particular important when the object to be scanned is geometrically featureless, such as a High Voltage (HV) cable, cable joint or cable end. When scanning HV cables, these 3D markers shield measurement data located underneath these 3D markers, which can lead to an incomplete surface inspection which can cause missing defects/deviations underneath the markers. Moreover, for the scanning of HV cable ends, 3D marker (stickers) may leave glue residue on the surface, which can lead to poor electrical performance of the apparatus afterwards.

This is not ideal and there is thus a need for strategies to avoid this.

Examples of such strategies are:

Use of a scanner with blue laser technology not requiring talc spray.

Using sticky or magnetic 3D markers which positions on the surface are shifted halfway during the process so the data underneath these markers can be included in the inspection.

Using a 3D scanner that uses an external camera and 3D markers on the scanner itself to obtain the scanner position in relation to the test object without 3D markers on the surface.

Using specialized 3D marker JIGs that mount the markers, positioned close to the surface but not on it.

Such a 3D marker fixture or JIG can be arranged around the HV cable. A 3D marker fixture/jig should comply with at least some of the following objects:

Have enough mechanical strength so there is minimal movement between the structure, the markers, and the cable or cable sample arranged in it, as any motion during the scanning would interfere on data quality.

Comprise enough markers and an optimal spread between the markers to ensure that multiple markers are always visible from all angles. This minimizes the chance of losing the scanner's position in relation to the object.

Ensure an optimal distance between markers and surface underneath so both appear within range and line of sight for cable diameters within 30-170 mm.

Have a black matte surface appearance at the surface of the fixture to minimize glaring.

Comprise flat faces for fastening the markers. This ensures secure fastening and to avoid double detection that can occur if a marker is bent and thus is interpreted as more than one marker.

Have maximal through-visibility for the scanner optics (which for example detects from 2 angle-offset lenses) to detect a laser pattern projected on the surface within the fixture.

In one embodiment, a method for inspecting surfaces and/or interfaces of high voltage and/or medium voltage cable components, comprises:

a) capture and store a set of 3-dimensional, 3D, surface geometry measurement data of an area of interest of a surface of the cable component by moving a 3D surface scanner over the area of interest, b) inspect the captured 3D surface geometry measurement data from step a) to determine smoothness of the surface scanned by the 3D surface scanner, and c) compare the smoothness with threshold data to provide a quality report for the surface scanned by the 3D surface scanner.

The area of interest can be the surface of a sub-part of the cable component before assembling the cable component, and/or any surface as defined above.

The inspection performed in step b) can comprise measuring the roughness of the scanned surface, measuring irregularities comprised in the scanned surface, or other characteristics of a surface that can be of interest.

The 3D surface geometry measurement data can be represented by a data point cloud, ie. a collection of data points which can be further processed to provide a representation of the cable component.

In some embodiments, step a) can be repeated, providing several sets of 3D surface geometry measurements. The sets of 3D surface geometry measurements from each repeated step can then be merged to obtain a full 3D map of the damaged section of the cable.

In one configuration the method comprises identifying differences between the area of interest of the surface of the cable component and a 3D drawing of the area of interest of the surface of the cable component by comparing the 3D surface geometry measurement data of the area of interest with the 3D drawing of the area of interest and mark the differences in the 3D surface geometry measurement data to produce a deviation map.

There may be provided a system for inspecting surfaces and/or interfaces of high voltage and/or medium voltage cable components. The system comprises in one embodiment:

a non-contact surface scanner, for capturing at least one set of 3D surface geometry measurement data of an area of interest of the cable component by moving the non-contact surface scanner over the cable component over the area of interest, a memory unit for storing multiple 3D surface geometry measurement data of the area of interest, a processor connected to the non-contact surface scanner, configured to inspect the captured 3D surface geometry measurement data to determine smoothness of the surface scanned by the surface scanner, and compare the smoothness with threshold data to provide a quality report for the surface scanned by the surface scanner.

In an example, in addition to or alternatively to the above described methods and systems, a portable or lab based optical profilometer can be used to scan surfaces, such as an electrode surface. Using an optical profilometer can provide micrometric or nanometric X,Y,Z datapoints of a few, millimeter, or possibly as low as 0.1 um sized measurement domain sections on metallic electrodes received from parts manufacturers. Thereafter, the data is post-processed digitally, and roughness parameters can be computed. Based on the roughness parameters and/or further computations made on the data, a go/no go criteria is created for the part in question, as well as a quality verification report.

In one example, there is provided a method for inspecting surfaces of parts and/or equipment for manufacture of high voltage and/or medium voltage cable components which comprises the following steps:

a) capture and store a set of 3-dimensional (3D) surface geometry measurement data of an area of interest of a surface of the cable component by moving a 3D surface scanner over the area of interest, b) compare the captured 3D surface geometry measurement data from step a) with a previously stored set of 3D surface geometry measurement data or a 3D drawing of the part, and c) record any differences in a quality report for the inspected surface.

In one embodiment the method comprises marking the differences in the 3D surface geometry measurement to produce a deviation map and/or storing the scanned data for the next time the part is to be serviced.

BRIEF DESCRIPTION OF THE DRAWINGS

The invention will now be described in more detail by means of examples and with reference to the figures.

DETAILED DESCRIPTION

Figure 1:
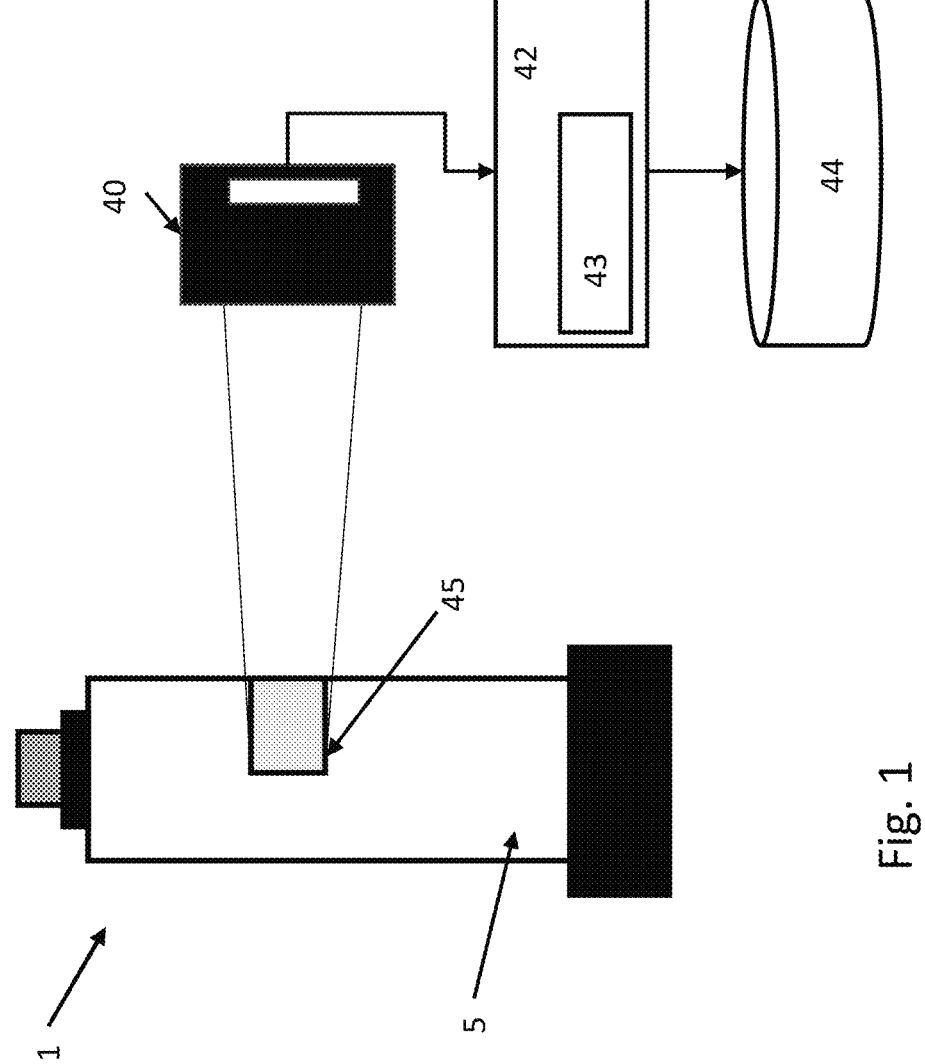
FIG. 1 illustrates an example of a 3D surface geometry measurement of a surface of a cable.

FIG. 1 is a schematic illustration of a system according to the present invention for scanning the surface 5 and/or interfaces of high voltage and/or medium voltage cable components, in this example a cable end 1. The sizes of various object of the illustration are not in scale. The system comprises a non-contact surface scanner 40. The non-contact surface scanner 40 is directable to an area of interest 45.

In one embodiment, the non-contact surface scanner 40 may be a 3D laser scanner. The scanner may also be other types of non-contact surface scanners, for example white line scanners using projected white lines able to project up to 1,500,000 measurements/s and/or 99 white light scanning lines, or other kinds of suitable scanners.

The non-contact surface scanner 40 is arranged to measure the distance to the surface 5 of the area of interest. In the example in the figure, the field-of-view of the non-contact surface scanner corresponds to the area of interest, but the area of interest 45 on the surface 5 may be larger or smaller by the field-of-view or scanning area of the non-contact surface scanner 40. The field-of-view may be round, rectangular, linear or any other shape as determined by the non-contact surface scanner. The non-contact surface scanner 40 is movable around the cable 1 such that the surface 5 of the cable 1 is covered by a plurality of sub-areas in order to ensure that the entire area of interest is scanned. The size of plurality of sub-areas may vary, for example by varying the distance between the non-contact surface scanner 40 and the cable 1. In one embodiment the non-contact surface scanner 40 is freely movable in any direction around the cable 1, such as a handheld 3D laser scanner.

The non-contact surface scanner 40 should know its position and direction in 3D space, for example by recognizing a plurality of markers (not shown) positioned on the surface 5. The markers may be stickers or sterile clamps with specific patterns or markers thereon. The markers will result in "NaN" (not a number=empty) areas underneath them, however, the scan can be paused, markers/clamps relocated and then the measurement can also scan the area under the markers. Alternatively, the empty areas may be filled in with interpolated data, where the interpolation is based on nearby data.

In another embodiment the non-contact surface scanner 40 may be mounted to a fixture or jig, e.g. mountable to the HV-cable, such that the non-contact surface scanner 40 may be moved up/down and around the surface 5 to completely fill the area of interest 5 with sub-areas. In this way, using markers may be avoided. An example of such a jig will be described below. In other embodiments, the non-contact surface scanner 40 can be arranged in a fixture or jig, and the cable may be moved relative to the scanner 40.

In some embodiments, the geometry of the scanned surface itself may be used as reference for the position of the non-contact surface scanner 40 itself in 3D space.

The illustrated system also comprises an analysis part 42. The analysis part 42 is in communication with the non-contact surface scanner 40 over a wired or wireless communication link. In one embodiment, at least parts of the analysis part 42 may be comprised in the non-contact surface scanner 40. The analysis part 42 comprises a processor 43 adapted to process measurement data from the non-contact surface scanner 40 for each of the plurality of sub-areas to create a 3D surface geometry measurement of the area of interest 45, and thus the surface to be evaluated. The 3D surface geometry measurement can be processed to evaluate the characteristics of the surface and can also create an image of the surface for evaluation and for later reference.

In one embodiment, the analysis part can provide a go/no go evaluation. In this way an operator may receive a go or a no go message after the scan is performed, allowing or disallowing the operator to proceed with the cable part.

The criterium for providing a go/no go evaluation may be based on a selection of criterions. The criterions can be selected depending on the type of cable part to be scanned, the type of non-contact scanner used and the purpose of the scan. Examples of criterions are: a height variation threshold, a surface derivative threshold, a peeling wave threshold and/or at least one of an area of a cut, a depth of a cut, and a slope of a cut.

For laser scanners, criterions can comprise macro-geometric control, alignment and object bend, flatness, slope/macro-derivate, macro-height/indentation, ovality, size, larger Steps.

For optical profilometry, criterions can comprise derivatives, height, roughness parameters and/or local computed field enhancement factor (FEF).

Further criterions may be employed after further processing of the 3D surface geometry measurement data. Further processing can for example be levelling and sorting the data. Examples of further criterions are local derivatives, local indentation and noise level.

The analysis unit can use the above to identify the worst regions of the area of interest, such as deeper cuts, nicks, scratches, steps, for example by means of finite element method (FEM). The method can calculate local computed FEF and local computed partial discharge inception voltage (PDIV).

In one embodiment, the analysis part 42 is adapted to transmit the 3D surface geometry measurement to a storage device 44 as a 3D topographic map of the area of interest 45. The analysis part 42 is in communication with the storage device 44 over a wired or wireless communication link. The storage device 44 may be on on-premise server or cloud server. The 3D topographic map of the surface 5 of the cable 1 on the server 44 may be accessible to users and clients for future reference of the cable system.

Figure 2:
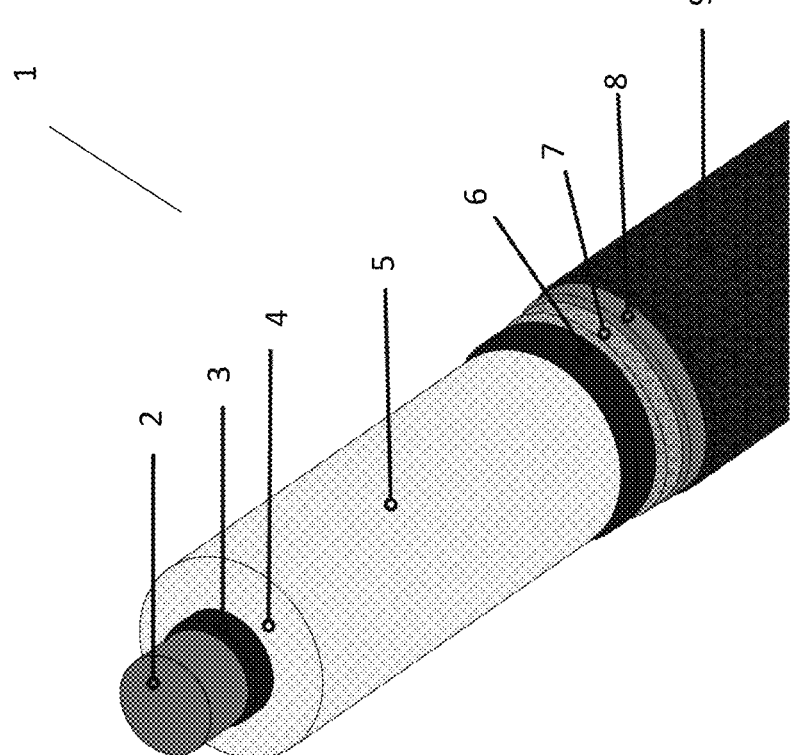
FIG. 2 illustrates a high volt cable end.
Figure 2:
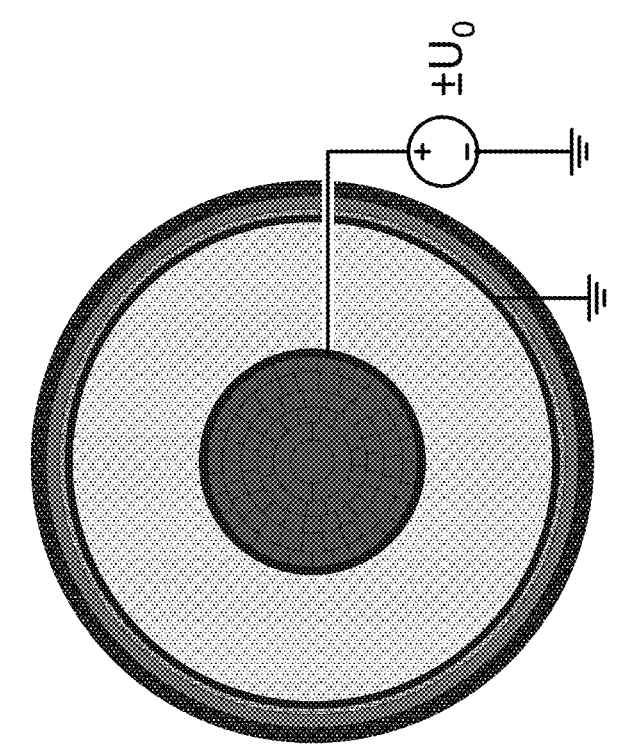

FIG. 2 illustrates a detailed view of a high voltage cable end and thus also the composition of a high voltage cable. As shown is an exemplary high voltage cable end 1. The outer sheath 9, the lead sheath 8, swelling tapes 7 and the outer semiconducting screen 6 have been removed at the end, leaving the conductor 2, the inner semiconducting screen 3 and the insulation 4. The surface 5 of the insulation 4 can be inspected to ensure that there are no irregularities, before a high voltage cable accessory component, such as high voltage joint, termination for the cable, or a rubber joint, is slipped over it.

Figure 3:
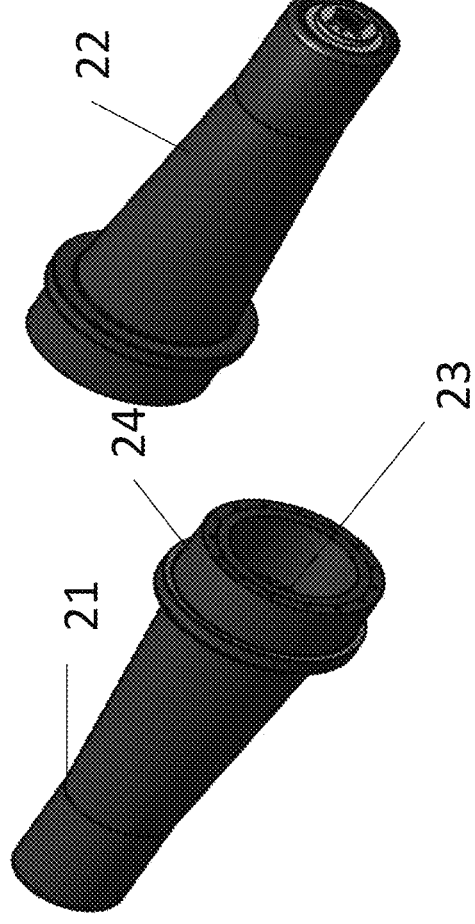
FIG. 3 illustrates an example of an epoxy insulator.

FIG. 3 illustrates an example of a high voltage epoxy insulator. A 3D scan can be performed by employing a 3D laser scanner or other non-contact scanner to determine the geometry of the high voltage cable insulator, for example to compare with acceptable tolerances for different parts and deviations therefrom. The scanned 3D geometry can be compared to a 3D drawing of the cable part of interest to evaluate the compliance or to reveal if the deviations are too large to accept, thus providing basis for a go/no go evaluation. For epoxy insulators, the inner surface 23, outer surface 21, 22 various intermediate parts 24 and components of the parts that connect between the high voltage and ground on the component can be scanned. The accuracy of the scan may be 0.025 mm however not limited to the same.

The figure shows an epoxy insulator with dimensions 1.5m×00.6 m, which for example is used in a 420 kVAC or up to 525 kVDC GIS system. The surfaces to be scanned encompass the inner and outer surfaces of the epoxy parts that connect between HV and ground in this component. However, the same method can be used for other molded insulative spacers within GIS or oil filled cable accessory assemblies, insulative tubes (with our without rain sheds) used to house the outdoor terminations, or other insulative spacers in oil, air, and GIS environments.

The scan may be performed on the inner surface 23 and outer surface 21, 22 separately. For example, to begin with scan may be performed on the inner surfaces 23. The 3D laser scanner can project a hatched laser pattern onto the inner surface of the epoxy insulator, for example by rotating the insulator and ensuring the entire insulator surface inside is scanned and covered by the scanner. If the scanner is a handheld device, the scanner itself can be moved to cover the entire surface.

In the second step, a scan may be performed on the outer surface 21, 22 of the insulator. During this procedure, similar to the scan of the inner surface, the insulator or the scanner may be rotated and adjusted to ensure the entire outer surface 21 is covered by the scan.

Next step is to run a post-processing algorithm on the scanned data that detects and highlights any irregularities such that a go/no go criteria, as well as an inspection report can be generated. This can be performed by means of a processor, for example the analysis part 42 described in FIG. 1, which is adapted to provide a 3D surface geometry measurement which can be transmitted to a storage device 44 as a 3D topographic map. The 3D topographic map of the surface 5 of the cable 1 on the server 44 may be accessible to users and clients for future reference of the cable system.

In case of a no-go criteria being detected, the insulator may be post processed, for example by sanding and/or polishing the surface with irregularities to provide an acceptable surface.

The post-processing algorithm can be designed to determine the orientation of the defects with respect to the tangential field stress. Then the scanned data for the full life-cycle of the product/part can be stored, enabling also its use in physics based digital twin models.

The scanned data can further be compared to drawings in order to evaluate if the insulators are according to the specifications, and can be compared to previous scannings to evaluate degree of wear and to learn how prolonged use influences the insulators.

A similar approach can be done for other kinds of objects, parts and equipment. As described earlier, tracking wear and monitoring quality over time of equipment such as screws, dies, matrices, etc., have been challenging. Such items can thus be scanned as described above and a 3D surface geometry measurement can be achieved. The 3D surface geometry can be transported to a 3D topographic map of the surface of the equipment under inspection. The 3D measurement data can then be analyzed to detect wear or faults on the surface of the equipment/part. The analysis can comprise:

Comparing the entire geometry of the inspected part against a previously performed scan or a 3D drawing of the part under inspection, to distinguish any change in geometric shape.

To run an algorithm that may detect smaller defects and perform quality control on this automatically To compare the scan data before and after a service operation on the part in question, tracking the improvement of surface and geometric quality, as well as detecting the degree of material removal during this process.

To store the scanned data for the next time the part is to be serviced.

Figure 4:
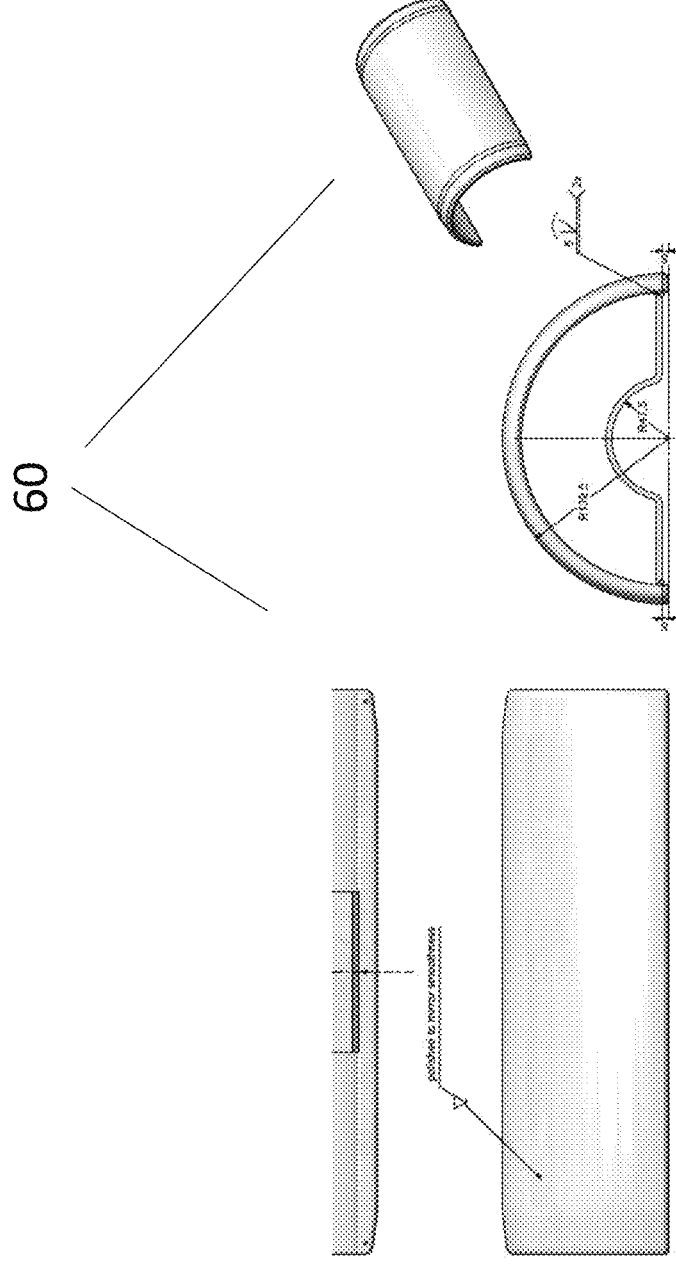
FIG. 4 illustrates an example of an HV electrode within a GIS system.

FIG. 4 illustrates an example of an HV electrode 60 within a GIS system. Such electrodes can be used within gas or oil filled HV cable components/apparatuses/accessories and require high quality surface finish, as any higher levels of surface roughness may reduce the electrical performance and the electrical durability of the system.

HV electrodes typically feature an electric field perpendicular to the surface, such that any roughness can create local fields several places along the surface, which reduces electrical performance through higher leakage currents and lowered breakdown strength for the electrodes.

To control this surface finish, for example for parts that are supplied from external vendors, it is important to ensure that specified levels of surface smoothness are met. This can be done by scanning the surfaces as described above, and then compare the scanned data with the drawings and specifications provided by the parts manufacturer. The comparison can reveal if the surfaces deviate from the specifications and provide a go/no go criterium and/or trigger an action to improve the surface or replace the electrode.

Figure 5:
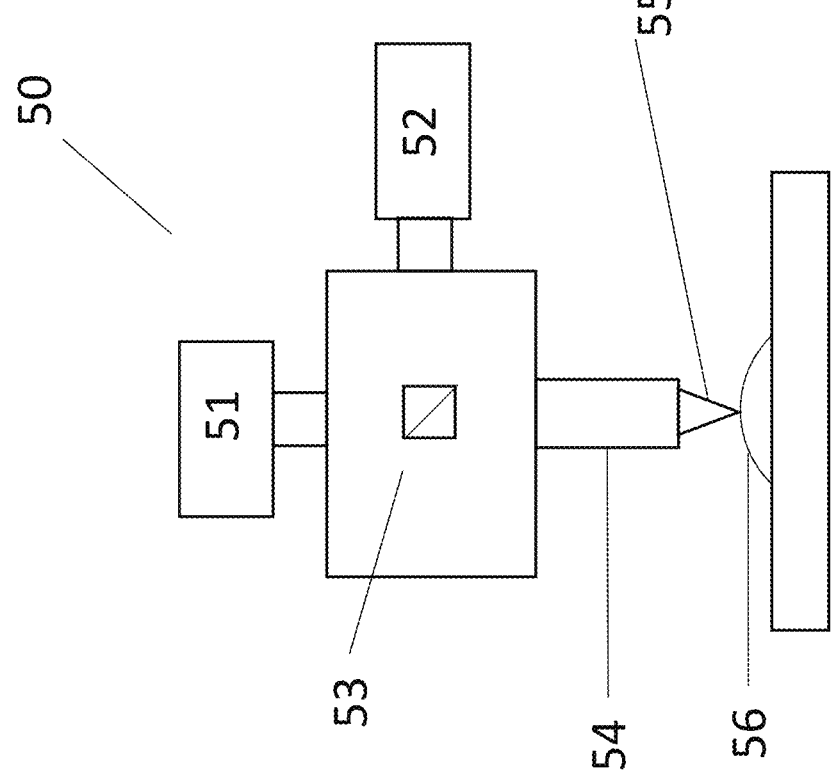
FIG. 5 illustrates an optical profilometer.
Figure 5:
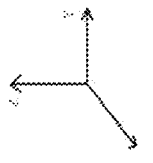

FIG. 5 illustrates an optical profilometer 50. Optical profilometers, also called optical surface profilers, are optical non-contact instruments for precisely measuring surface profiles. Essentially, they measure the surface elevation z as a function of lateral coordinates x and y over some area. An optical profilometer comprises a light source 51 which is split into two paths by a beam splitter 53. One path directs the light through a lens 54, as light 55, onto the surface 56 under test, the other path directs the light to a detector 52. Reflections from the two surfaces are recombined on the array detector 52. When the path difference between the recombined beams is on the order of a few wavelengths of light or less interference can occur. This interference contains information about the surface contours of the test surface. Vertical resolution can be on the order of several angstroms while lateral resolution depends upon the objective and is typically in the range of 0.3-8 microns.

Figure 6:
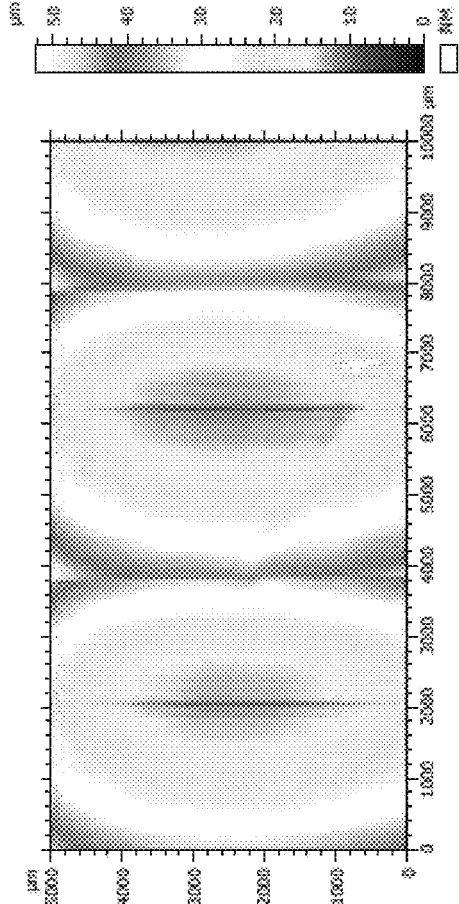
FIG. 6 illustrates an example of a height map resulting from an optical profilometer scan FIGS. 7 *a* and 7b illustrates examples of a fixture/jig 70, 71 for providing positioning markers

FIG. 6 illustrates an example of a height map resulting from an optical profilometer scan of a 5×10 mm scanning section. The data can then be processed digitally to calculate roughness parameters. Based on the roughness parameters, and possible further processing parameters, a go/no go criteria can be created, as well as a quality verification report.

FIGS. 7 *a* and 7*b* illustrates examples of a fixture/jig 70, 71 for providing positioning markers used during capture of 3-dimensional (3D) surface geometry measurement data of an area of interest of a surface of the cable or cable component by moving a 3D surface scanner about the cable over the area of interest. As described above, rather than placing markers on the surface itself, there is provided a fixture which can be arranged close to the inspection parts, where the fixture comprise 3D markers.

The fixtures 70, 71 is designed to comprise a lattice of hexagonal structures 72, 73 that forms a tube-like structure that can be arranged around the surface to be scanned. In the example of FIG. 7*a*, the fixture comprises six faces where each face comprises a row of hexagons 72. The markers are arranged at fastening surfaces 75 arranged at the corners of the hexagons. This ensures that there are enough markers and an optimal spread between the markers which leads to there being multiple markers always visible from all angles, which minimizes the chance of losing the scanners position in relation to the object, which can negatively impact data quality. The flat faces of the markers also allow for easily placing clipping planes during the scanning session, which allow for automatic deletion of scanning data on the fixture itself. This also enables the option to use a pre-scanned markers, where the clipping plane contains files specific for the fixture itself allowing for rapid set-up time.

Other arrangements of the lattice are also possible, such as other close-packing atomically-inspired patterns, for example triangular, cubic, pentagon, or random patterns.

The surface to be scanned, for example the surface of an electrode or other cable part, cable component or accessory, is arranged inside the fixture 70 and held in place by means of support elements 74. The support elements 74 are in this embodiment arranged at both ends of the fixture 70, but in other embodiments, there may be more or fewer support elements. The support elements 74 in this example are arranged as pins extending inwards and having a support face at the far end of the pin. The support face can contact the cable part to be scanned. The pins can be adjusted to ensure optimal distance between markers and the surface in the fixture, so both appear within range and line of sight for the scanner.

In this example, there are arranged six support elements 74, each extending from one of the faces forming the fixture. In this way, the cable part will be securely fixed in the fixture, thus minimizing movement between the structure, the markers, and the cable part in it. This is an important feature, as any such motion during the scanning would seriously hamper data quality. In other embodiments there may be arranged more or less than six support elements, in each case adapted to the requirements for each specific use.

The support elements may be arranged with each having the same length reaching from the point connecting them to the fixture to the far end. Other arrangements may be used, which ensures that the cable part is centered in the fixture.

The fixture can be embodied with a black matte surface appearance on the fixture to minimize glaring.

The invention claimed is:

1. A method for inspecting surfaces and/or interfaces of high voltage and/or medium voltage cable components, comprising:
   a) capture and store a set of 3-dimensional, 3D, surface geometry measurement data of an area of interest of a surface of the cable component by moving a 3D surface scanner over the area of interest, wherein a fixture is arranged around the surface to be scanned for capturing the 3D surface geometry measurement data, said fixture comprising a plurality of positioning markers,
   b) inspect the captured 3D surface geometry measurement data from step a) to determine smoothness of the surface scanned by the 3D surface scanner, and
   c) compare the smoothness with threshold data to provide a quality report for the surface scanned by the 3D surface scanner.

2. The method according to claim 1, where the 3D surface geometry measurement data are represented by a data point cloud, where data points in the data point cloud can be further processed to provide a representation of the cable component.

3. The method according to claim 1, comprising repeating step a) and where the sets of 3D surface geometry measurement data from each repeated step are merged to obtain a full 3D map of a damaged section of the cable component.

4. The method according to claim 1, where the inspection comprises measuring the roughness of the scanned surface.

5. The method according to claim 1, where step b) comprises measuring irregularities comprised in the surface scanned by the 3D surface scanner.

6. The method according to claim 1, where the area of interest is the surface of a sub-part of the cable component before assembling the cable component.

7. The method according to claim 1, comprising identifying differences between the area of interest of the surface of the cable component and a 3D drawing of the area of interest of the surface of the cable component by comparing the 3D surface geometry measurement data of the area of interest with the 3D drawing of the area of interest and mark the differences in the 3D surface geometry measurement data to produce a deviation map.

8. A system for inspecting surfaces and/or interfaces of high voltage and/or medium voltage cable components, the system comprising:
   a non-contact surface scanner, for capturing at least one set of 3D surface geometry measurement data of an area of interest of a surface of the cable component by moving the non-contact surface scanner over the area of interest,
   a fixture for arranging around the surface to be scanned for capturing the 3D surface geometry measurement data, said fixture comprising a plurality of positioning markers,
   a memory unit for storing multiple 3D surface geometry measurement data of the area of interest,
   a processor connected to the non-contact surface scanner, configured to inspect the captured 3D surface geometry measurement data to determine smoothness of the surface scanned by the surface scanner, and compare the smoothness with threshold data to provide a quality report for the surface scanned by the surface scanner.

9. The system according to claim 8, where a number of sets of 3D surface geometry measurement data are merged to obtain a full 3D map of a damaged section of the cable component.

10. The system according to claim 8, where the inspecting comprises measuring the roughness of the surface scanned by the surface scanner.

11. The system according to claim 8, where the inspecting comprises measuring irregularities comprised in the surface scanned by the surface scanner.

12. A method for inspecting surfaces of parts and/or equipment for manufacture of high voltage and/or medium voltage cable components, comprising:
   a) capture and store a set of 3-dimensional, 3D, surface geometry measurement data of an area of interest of a surface of the cable component by moving a 3D surface scanner over the area of interest, wherein a fixture is arranged around the surface to be scanned for capturing the 3D surface geometry measurement data, said fixture comprising a plurality of positioning markers,
   b) compare the captured 3D surface geometry measurement data from step a) with a previously stored set of 3D surface geometry measurement data or a 3D drawing of the cable component, and
   c) record any differences in a quality report for the inspected surface.

13. The method according to claim 12, comprising marking the differences in the 3D surface geometry measurement data to produce a deviation map.

14. The method according to claim 12, comprising storing the 3D surface geometry measurement data for the next time the cable component is to be serviced.

* * * * *